United States Patent Office 3,749,795
Patented July 31, 1973

3,749,795
METHOD OF STERILIZING USING CYCLOPROPANE CARBOXYLIC ALKYL CARBONIC ANHYDRIDE
Robert K. Krueger and Peter D. Bayne, Shorewood, and Steven S. Weston, Milwaukee, Wis., assignors to Nutrico, Inc., Milwaukee, Wis.
No Drawing. Original application Sept. 27, 1967, Ser. No. 671,101, now abandoned. Divided and this application Mar. 29, 1971, Ser. No. 129,150
Int. Cl. A01n 9/24
U.S. Cl. 424—301                3 Claims

ABSTRACT OF THE DISCLOSURE

This invention relates to a method for eliminating growth and reproduction of microorganisms by use of a compound having the formula:

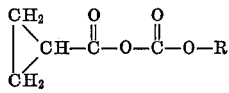

where R is hydrogen or a carbon-containing radical having up to 24 carbon atoms. When added to a perishable material, the compound will eliminate microorganism activity and will decompose to form generally neutral products.

---

This application is a division of application Ser. No. 671,101, filed Sept. 27, 1967, now abandoned.

Pyrocarbonic acid esters, such as diethyl pyrocarbonate, have been used in the past for preserving perishable materials such as fruit pulp, vegetables, pharmaceutical products, and the like, and have the advantage of decomposing into materials which are compatible with food products.

The present invention relates to a method of sterilizing by use of a new group of compounds which are more effective than the pyrocarbonates in eliminating microorganism activity. As in the case of the pyrocarbonates, the compounds will decompose to form generally neutral products so that they can be used to preserve a wide variety of perishable products, as well as inert objects.

The compound to be used in the method of the invention has the following general formula:

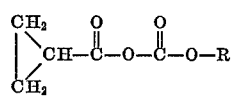

where R is hydrogen or a carbon containing radical having up to 24 carbon atoms, such as lower alkyl, cycloalkyl, lower alkenyl, cycloalkenyl, lower alkynyl, cycloalkynyl, aryl and mixed alkyl-aryl. These radicals can also include various substitutents, for exampe, acetamido, acetoxy, acetyl, alkoxy, amino, benzoxy, bromo, chloro, cyano, epoxy, florohydroxy, iodo, keto, nitro, nitroso, phenoxy, sulfonyl, thio, thionyl, and the like. Of this group it has been found that cyclopropane carboxylic ethyl carbonic anhydride is particularly effective as a sterilizing agent.

The anhydrides can be prepared by conventional techniques similar, except for the starting materials, to the processes edscribed in Pat. 3,219,684 and in "The Stability of Mixed Carboxylic-Carbonic Anhydrides" Tarbell and Leister, J. Org. Chem. 23, 1149 (1958). In general, the compounds are prepared by dissolving the carboxylic acid and a tertiary amine in an organic solvent and then adding an alkyl chloroformate. The mixture is filtered to remove the precipitated amine hydrochloride and the filtrate contains the anhydride.

The organic solvent to be used in the preparation of the anhydride can be a conventional solvent such as toluene, benzene, cyclohexene, tetrahydrofuran, carbon tetrachloride and other non-polar solvents. The minimum amount of solvent which may be used depends on the solubility of the reactants and generally from 5 to 20 parts by weight of solvent per part of the carboxylic acid are employed.

Among the tertiary amines which can be used are triethylamine, tributylamine, dimethyl aniline, n-ethyl piperidine and pyridine.

Ethyl chloroformate is preferred as the alkyl chloroformate, but other appropriately substituted chloroformates, as for example, methyl, propyl and butyl chloroformates can also be used in the embodiment of the invention. The reaction is generally carried out at atmospheric pressure and at temperatures of about 0° C. to about −60° C. with the reaction period varying from about 10 minutes to about 2 hours. During the reaction, the amine hydrochloride by-product is precipitated and is removed from the reaction product by filtration. The reaction product is present in the filtrate consisting of a solvent such as ether, toluene, benzene, carbon tetrachloride and other non-polar solvents, and the solvent is then distilled off to provide the anhydride product of the invention.

It has been found that the mixed anhydrides are highly effective as preservatives for perishable materials, particularly materials containing carbohydrates and/or proteins, such as vegetables; fruits; fermented beverages, such as wine, ale, beer; pharmaceutical products and the like. In addition, the mixed anhydrides can be used as topical antiseptics, surgical sterilizers, aerospace sterilizers, medical antimicrobial pharmaceuticals, industrial sanitizers, laundry sterilants, insecticides, fungicides, and in any other application where it is desired to limit or prevent microorganism activity.

When used to preserve a perishable material, the mixed anhydride is used in an amount of .0001 to 2% by weight of the perishable material and has the advantage of decomposing into generally neutral products.

When used as a sterilant or antiseptic, the mixed anhydrides can either be dissolved in water or in an alcoholic solution and applied in this form to the object to be sterilized. The concentration of the mixed anhydride in the solvent is not critical and can vary within wide limits depending upon the ultimate use.

Synthesis of cyclopropane carboxylic ethyl carbonic anhydride 43.0 grams (0.5 mole) of cyclopropane carboxylic acid were dissolved in 350 ml. of diethyl ether and cooled in an ice-salt bath. 50.7 grams (0.5 mole) of triethylamine were added with a slight exothermic reaction occurring.

When the temperature fell below 5° C., 48.0 ml. (0.5 mole) of ethyl chloroformate were added dropwise with continuous stirring during the course of 45 minutes. With continued stirring, the resulting mixture was allowed to come to room temperature in 2 hours. The triethylamine hydrochloride by-product was removed by vacuum filtration, and the ethereal filtrate was concentrated under water aspirator vacuum. The concentrate was then fractionally distilled under high vacuum to yield 66.3 grams of cyclopropane carboxylic ethyl carbonic anhydride (84%). The boiling point of the anhydride was 65–66° C./1 mm.

Calculated for $C_7H_{10}O_4$ (percent): C, 53.16; H, 6.37.
Found (percent): C, 53.27; H, 6.55.

Synthesis of cyclopropane carboxylic n-pentyl carbonic anhydride 8.6 grams of cyclopropane carboxylic acid and 10.2 grams of triethylamine were dissolved in 50 ml. of diethyl ether and cooled to 0° C. With continuous stirring, 15.1 grams of n-pentyl chloroformate were added dropwise within 10 minutes. This reaction mixture was held at 0° C. for one hour and then allowed to come to room temperature within two hours. The triethylamine hydrochloride byproduct was removed by vacuum filtration. Concentration of the filtrate on a rotary vacuum evaporator yielded 17.8 grams (89%) of the cyclopropane carboxylic n-pentyl carbonic anhydride. This concentrate was 91% pure by the morpholine titration technique.

Synthesis of cyclopropane carboxylic n-butyl carbonic anhydride 21.5 grams of cyclopropane carboxylic acid dissolved in 250 ml. of diethyl ether were treated with 25.8 grams of triethylamine. This mixture was cooled to below 5° C. and reacted with 34.2 grams of n-butyl chloroformate for 2 hours. This reaction mass was allowed to come to room temperature within 3 hours and then vacuum filtered to remove the solid triethylamine hydrochloride by-product. For solvent removal, the filtrate was concentrated on a rotary vacuum evaporator under water aspirator vacuum. The concentrate, cyclopropane carboxylic n-butyl carbonic anhydride, weighed 40.0 grams (86% yield) and had an average purity of 94% by the morpholine titration procedure.

Anti-microbial properties of cyclopropane carboxylic ethyl carbonic anhydride

An investigation was carried out to compare the sterilizing action of cyclopropane carboxylic ethyl carbonic anhydride with a known sterilizing agent, diethyl pyrocarbonate, as disclosed in Pat. 2,910,400, as well as with related mixed anhydrides, cyclobutane carboxylic ethyl carbonic anhydride and cyclohexane carboxylic ethyl carbonic anhydride. A mixture of 10 different 48-hour old, naturally occurring beer wild and culture yeasts were added to beer prior to treatment with the sterilizing compounds. The calculated amount of cyclopropane carboxylic ethyl carbonic anhydride was first dissolved in ethanol and then a known aliquot of this solution was added to a series of empty beer bottles prior to filling with the infected beer to provide, after filling, concentrations of cyclopropane carboxylic ethyl carbonic anhydride of 50, 100 and 150 p.p.m. respectively. In a similar manner, concentrations of 50, 100 and 150 p.p.m. of diethyl pyrocarbonate, cyclobutane carboxylic ethyl carbonic anhydride and cyclohexane carboxylic ethyl carbonic anhydride, respectively, were added to additional series of beer bottles prior to filling with the infected beer in the manner previously described with respect to cyclopropane carboxylic ethyl carbonic anhydride. Untreated control bottles were obtained of the same beer.

After addition of the sterilizing compounds, the bottles were filled, capped immediately and incubated at room temperature for 1 and 2 weeks respectively.

After incubation the samples were examined for microbiological growth using the Millipore filtration technique, and compared with untreated control samples of the infected beer. The results are shown in the following table:

| Sterilizing agent | Conc., p.p.m. | Microorganism count per 100 ml. | | | | | |
|---|---|---|---|---|---|---|---|
| | | Original | | 7 days | | 14 days | |
| | | Aerobic | Anaer. | Aerobic | Anaer. | Aerobic | Anaer. |
| Diethyl pyrocarbonate | 0 | TNTC | TNTC | TNTC | TNTC | TNTC | TNTC |
| | 50 | TNTC | TNTC | 7 | 7 | 15 | 2 |
| | 100 | TNTC | TNTC | 0 | 0 | 0 | 0 |
| | 150 | TNTC | TNTC | 0 | 0 | 0 | 0 |
| Cyclopropane carboxylic ethyl carbonic anhydride | 0 | TNTC | TNTC | TNTC | TNTC | TNTC | TNTC |
| | 50 | TNTC | TNTC | 0 | 1 | 0 | 0 |
| | 100 | TNTC | TNTC | 0 | 1 | 0 | 0 |
| | 150 | TNTC | TNTC | 0 | 0 | 0 | 0 |
| Cyclobutane carboxylic ethyl carbonic anhydride | 0 | TNTC | TNTC | TNTC | TNTC | TNTC | TNTC |
| | 50 | TNTC | TNTC | 500 | TNTC | 6 | 500 |
| | 100 | TNTC | TNTC | 100 | 300 | 10 | 300 |
| | 150 | TNTC | TNTC | 50 | 200 | 3 | 150 |
| Cyclohexane carboxylic ethyl carbonic anhydride | 0 | TNTC | TNTC | TNTC | TNTC | TNTC | TNTC |
| | 50 | TNTC | TNTC | 150 | 200 | 300 | 250 |
| | 100 | TNTC | TNTC | 75 | 125 | 150 | 75 |
| | 150 | TNTC | TNTC | 25 | 75 | 4 | 0 |

NOTE.—TNTC=Too numerous to count.

The results set forth in the above table indicate that cyclopropane carboxylic ethyl carbonic anhydride was markedly more effective as a sterilizing agent than diethyl pyrocarbonate, for a concentration of as little as 50 p.p.m. virtually eliminated the organism count after one week and completely eliminated the count after 14 days. In contrast to this, a like concentration of 50 p.p.m. of diethyl pyrocarbonate did not eliminate the microorganism count after 7 days or 14 days.

Furthermore, the results shown in the table illustrate that cyclopropane carboxylic ethyl carbonic anhydride is decidedly more effective as a sterilizing agent than the related compounds, cyclobutane carboxylic ethyl carbonic anhydride and cyclohexane carboxylic ethyl carbonic anhydride. This result is completely unobvious and unexpected in that one skilled in the art would normally expect the higher molecular weight compounds, i.e. the cyclobutane and cyclohexane derivatives, to be more effective against microorganisms than the lower molecular weight cyclopropane derivative. However, the cyclopropane derivative is definitely superior as a sterilizing agent to the cyclobutane and cyclohexane derivatives.

Various modes of carrying out the invention are contemplated as being within the scope of the following claims, particularly pointing out and distinctly claiming the subject matter which is regarded as the invention.

We claim:

1. A method of preserving a perishable material selected from the group consisting of carbohydrates and proteins, comprising the step of contacting the perishable material with a sterilizing amount of a compound having the formula:

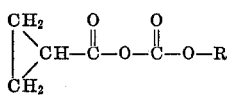

where R is selected from the group consisting of hydrogen and lower alkyl radicals.

2. The process of claim 1 wherein the compound is used in an amount of 0.0001 to 2% by weight of the perishable material.

3. The process of claim 1 wherein R is ethyl.

References Cited
UNITED STATES PATENTS

| | | | |
|---|---|---|---|
| 2,910,400 | 10/1959 | Bernhard et al. | 424—301 |
| 3,186,906 | 6/1965 | Genth et al. | 424—301 |
| 3,219,684 | 11/1965 | Windholz | 260—463 |
| 3,514,463 | 5/1970 | Robinson et al. | 260—463 X |

ALBERT T. MEYERS, Primary Examiner

D. W. ROBINSON, Assistant Examiner